Sept. 13, 1960 — P. PEGARD — 2,952,159
INTERMITTENT DRIVE
Filed April 13, 1956

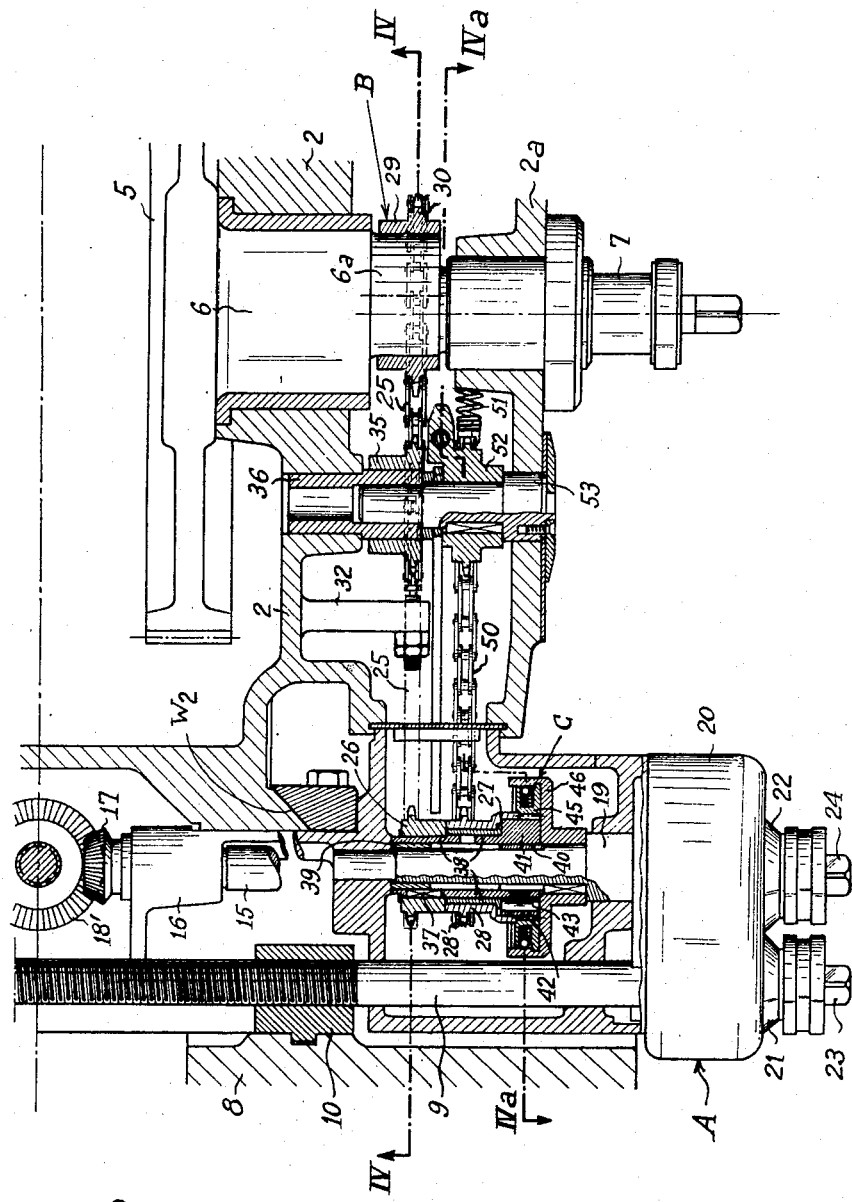

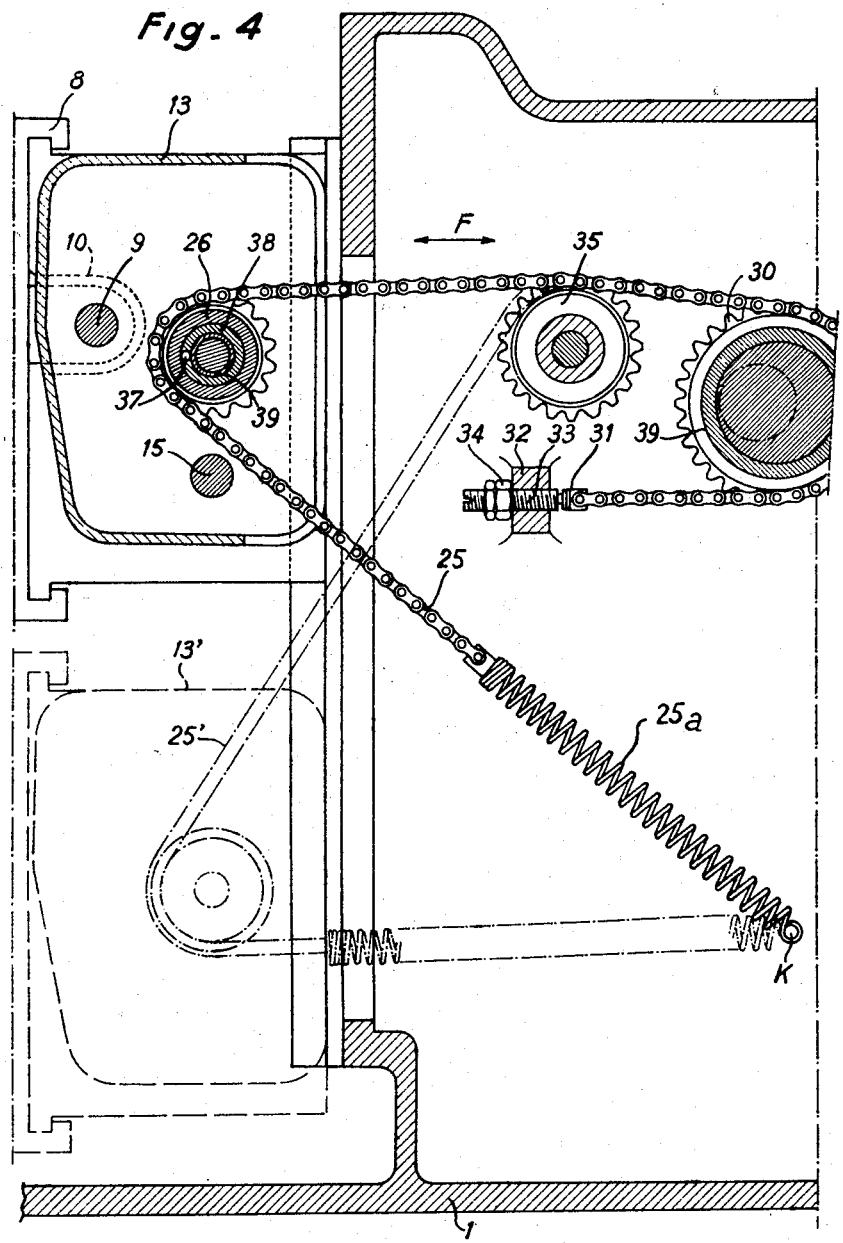

Sept. 13, 1960    P. PEGARD    2,952,159
INTERMITTENT DRIVE
Filed April 13, 1956    5 Sheets-Sheet 4

INVENTOR.
PIERRE PEGARD
ATTORNEY.

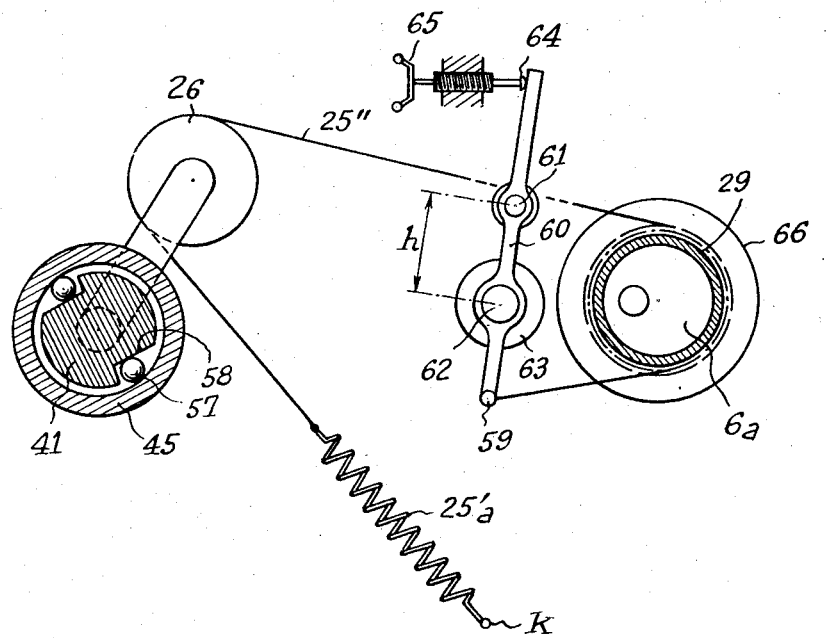

United States Patent Office 2,952,159
Patented Sept. 13, 1960

2,952,159

INTERMITTENT DRIVE

Pierre Pegard, Courbevoie, France, assignor to Ateliers G.S.P., Courbevoie, France, a French society Filed Apr. 13, 1956, Ser. No. 578,085

Claims priority, application France Apr. 15, 1955

9 Claims. (Cl. 74—116)

This invention relates to intermittent drive systems of the type wherein a continuous rotation of a drive member is converted into an intermittent one-way advance of a driven member, and the invention is of especial utility in connection with machine tools for imparting intermittent feed displacements to components thereof, e.g. to the work-table of a shaper during the return displacement of the slide.

It is conventional to derive an intermittent displacement from a continuous rotation, by the general method which involves first converting the continuous rotation into a reciprocatory motion, using e.g. an excentric for this purpose, and then converting the reciprocation into the desired intermittent displacement of the driven member through a one-way drive connection of any suitable character, such as a pawl-and-ratchet mechanism, a free-wheel device or the like. Difficulties are encountered however when it is desired to impart the intermittent displacement to a driven part that forms part of an assembly which itself is movable relatively to the stationary frame on which the continuously-rotating drive member is journalled, and it is one object of this invention to overcome this difficulty and to provide an intermittent drive transmission that will be applicable under the circumstances just specified.

A further object is to provide such an intermittent drive system that will be readily adjustable, i.e. wherein the length of each incremental step imparted to the driven member may be controlled, such control being effected from the stationary frame of the machine. A related object is to provide such an adjustable intermittent drive wherein the adjustment will not be affected by movement of the movable assembly of which the driven member forms part. Yet further objects will appear.

In accordance with an important feature of this invention the continuous rotation of the driven member is converted into a reciprocatory motion of an element carried by the stationary frame of the machine. One advantage of this arrangement is that the components requiring to be lodged within the movable assembly are minimized, and moreover adjustment of the intermittent advance rate is facilitated since such adjustment may readily be effected by acting on the element carried by the stationary frame.

Desirably the reciprocatory element may comprise an expansible flexible element, such as a sprocket chain connected with an expansible spring, having its ends attached to the frame, and engaging both an excenter carried by the continuously rotated drive member, and the drive element of the one-way drive positioned in the movable assembly.

This invention will now be described by way of example but not of limitation with reference to the accompanying drawings, wherein:

Fig. 3 is a partial sectional view on line III—III of Fig. 4 illustrating details of the mechanism;

Fig. 4 is a vertical sectional view taken approximately along the line IV—IV of Fig. 3;

Fig. 5 is a simplified perspective view illustrating somewhat diagrammatically a modified embodiment of the invention.

Figure 1:
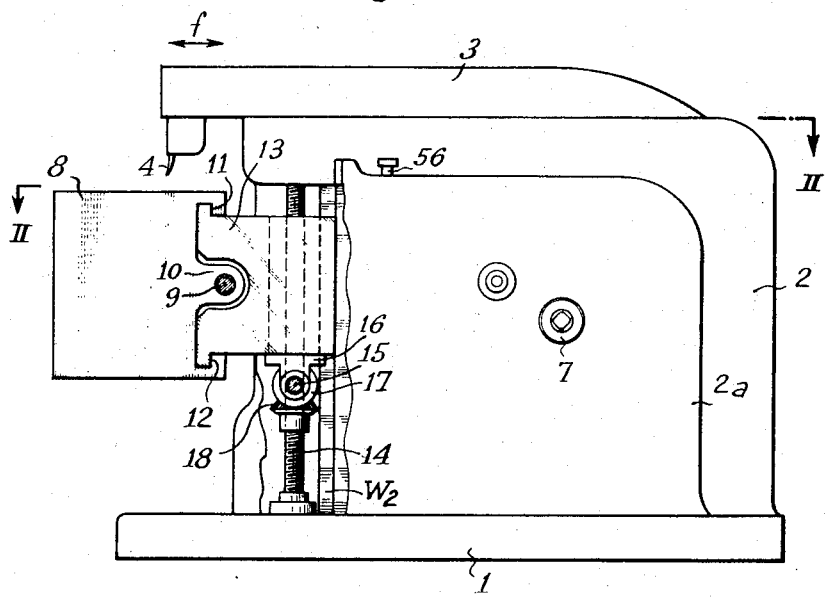
Fig. 1 is a side view, partly in section on line I—I of Fig. 2, illustrating a shaper machine constructed in accordance with the invention.
Figure 2:
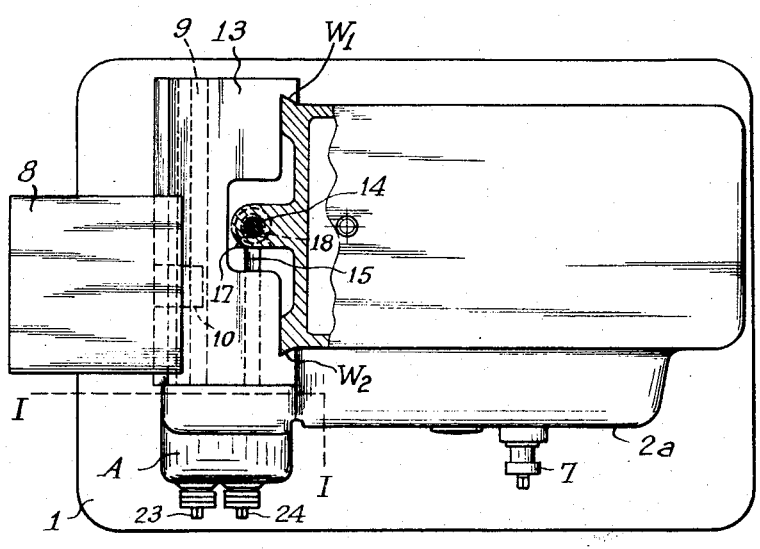
Fig. 2 is a corresponding plan view partly in section on line II—II of Fig. 1.
Figure 4A:
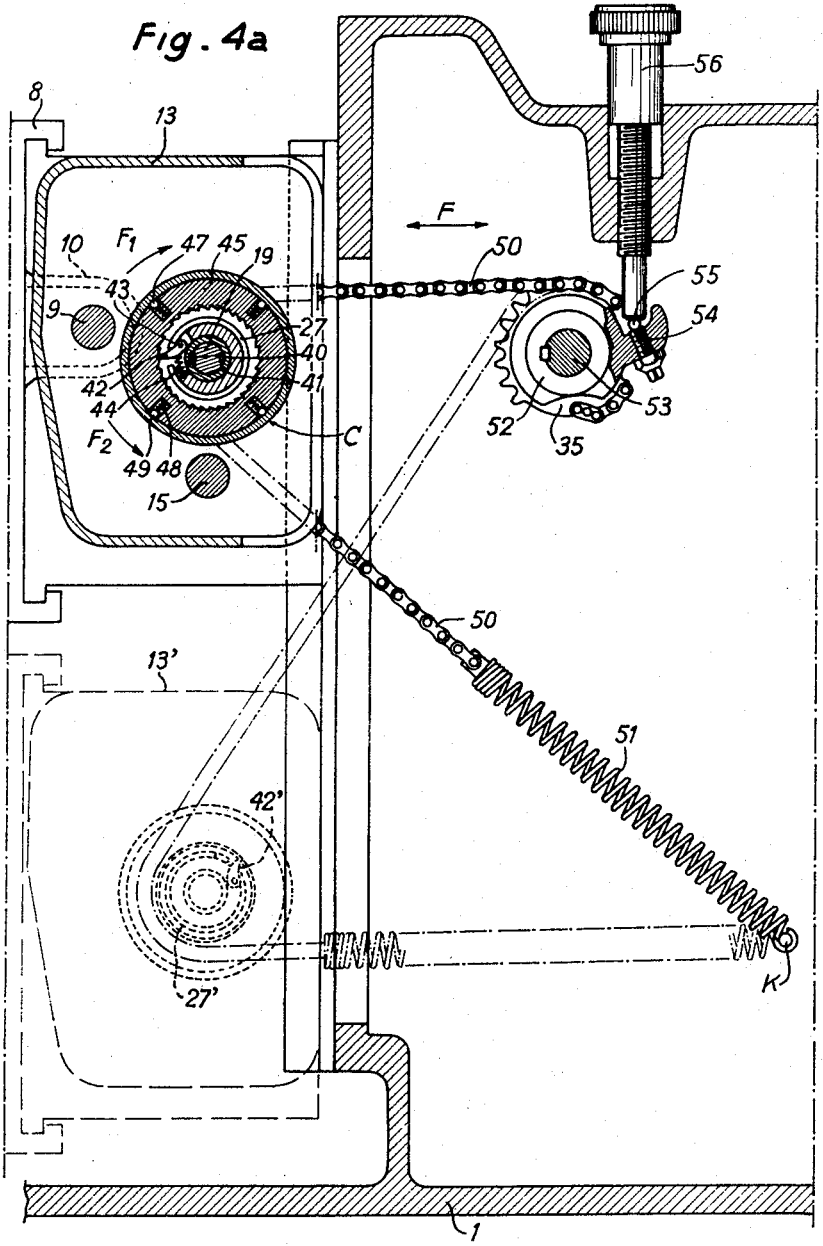
Fig. 4a is a similar view taken approximately along the line IVa—IVa of Fig. 3.

Referring to Fig. 1, a shaping machine comprises a base 1 on which is mounted a casing 2 containing the major part of the mechanism of the machine. Since this mechanism may be largely conventional only those components directly involved in the invention are illustrated in detail in Figs. 3 and 4. A slide 3 from which a tool 4 is supported is adapted for displacement relatively to the base and casing in the direction indicated by the arrows $f$.

The carriage or slide 3 receives its motion from a disc 5 (see Fig. 3) disposed within the casing 2 and secured on a shaft 6 journalled in the casing and having an end 7 projecting from a side of said casing.

The workpiece is adapted to be mounted on a table 8 which is movable in a direction normal to the plane of Fig. 1, being threaded on a screw shaft 9 which is journalled for rotation in a vertical traversing carriage 13, the shaft being engaged in a threaded opening formed in a projecting boss 10 of the table 8 so that rotation of the screw shaft will displace the table. The table is guided in its displacements by means of suitable ways 11 and 12 projecting from the vertically traversing carriage 13.

Extending through the carriage 13 is a vertical screw shaft 14 having its ends fixed in the base and casing. Carriage 13 is guided in its vertical movement by ways $W_1$ and $W_2$.

For imparting these vertical displacements to carriage 13 and hence to the table 8 there is provided a shaft 15 journalled in bearings 16 of the carriage 13 and carrying at one end thereof a bevel pinion 17 which meshes with a bevel pinion 18, the latter being engaged around the screw rod 14. Thus it will be understood that rotation of shaft 15 will rotate pinion 17 and pinion 18 which in turn will be constrained to move up or down along the fixed screw shaft 14 carrying the carriage and table assembly with it in its vertical movements.

In accordance with the invention means are provided for imparting an intermittent feed motion to one of the threaded shafts 9 or 15. Thus an intermittent motion imparted to screw shaft 9 produces a periodic transverse displacement of the table during the return movement of the slide 3, whereas the same intermittent motion imparted to screw shaft 15 produces a periodic vertical displacement of the table.

Referring to Fig. 3, a commutator unit is shown at A mounted on a side of the vertical carriage 13 and transmits intermittent motion from a main shaft 19 to one of the intermediate shafts 9 or 15.

Referring to Figs. 3 and 4, there will be seen the above-mentioned elements, particularly the shaft 9 and the shaft 15. The intermittent movements transmitted to one or the other of these two shafts, originate in a single transverse shaft 19 contained in the casing 13 adjacent the shafts 9 and 15. The shaft 19, by means of a selective gear transmission of known type contained in the gear box 20 transmits this intermittent movement to shafts 9 or 15 with an increased or reduced gear ratio, depending upon the setting of the transmission.

The setting of the extent of advance provided by rotation of shafts 9 and 15 is readily effected by use of the verniers 21 and 22 and the associated terminal extremities 23 and 24 of the shafts 9 and 15, respectively, upon which the verniers are mounted.

The shaft 19 receives its intermittent motion by suitable transmission from continuously rotating master shaft 6. In the embodiment illustrated, this transmission from continuous to intermittent motion is effected in the following manner: The continuous rotary movement of the master shaft 6 is first converted into a reciprocatory movement through an excentric generally designated at B, and comprising a crankpin 6a depending from the hub 6 in excentric relation therewith. Freely rotatable on pin 6a is a ring 29 having sprocket teeth 30 formed around its periphery engaged by a sprocket chain 25 which as shown in Fig. 4 has one end 31 attached to a bracket 32 projecting from a wall in an offset portion 2a of the casing 2. The chain is anchored to the bracket through an adjustable anchor device comprising a screw 33 and nut and locknut 34. The chain 25 is in engagement with an idler sprocket 35 journalled on a hollow shaft element 36 secured in the casing 2. The chain 25 is then trained about a sprocket gear 26 journalled on a shaft 19 journalled in the vertically movable carriage 13. The free end of the chain is attached to one end of a tension spring 25a the opposite end of which is anchored at a fixed point k. Thus it will be seen that on continuous rotation of the shaft 6 the excentric rotation of crankpin 6a will cause the tension spring alternately to expand and contract, and the chain 25 will cause reciprocating limited rotation of the sprocket pinion 26 and idler 35.

Sprocket 26 is secured by a key 37 to a sleeve 38 which is mounted for rotation about the shaft 19 through a pair of bearing bushings 39 and 40. The lower end of sleeve 38 has a radially projecting part which constitutes the hub 41 (Fig. 4a) of a free-wheel device. This device comprises a casing 46 having a tubular bottom end part (Fig. 3) keyed to the shaft 19 and an upwardly open bell-shaped upper part in which is received a cylindrical member 45 having an outer periphery closely fitting the inner periphery of said bell-shaped part of casing 46, with a number of radial sockets formed in said outer periphery and containing balls 47 which are spring-urged in a radially outward direction by springs 49 located in said sockets. Thus the inner member 45 is normally applied in firm frictional engagement with the outer member 46.

The inner member 45 is formed with a set of internal ratchet teeth which are adapted to be engaged by a pawl 42 pivoted on a pin 43 which is secured within a recess of the hub portion 41, and the pawl is urged into engagement with the ratchet teeth by a spring 44. The arrangement is such therefore that the limited reciprocatory rotation of the sprocket gear 26 and hub 41 will result in an intermittent one-way rotation of the outer bell member 46 and shaft 19 rigid therewith. Thus an intermittent feed motion is imparted to the vertically movable carriage assembly on continuous one-way rotation of the drive shaft 6.

Means are provided for controlling the rate of this intermittent vertical displacement by controlling the angular arc over which the one-way drive device C is operative; i.e. by rendering the one-way drive inoperative over a greater or smaller part of its full range of displacement, the length of each incremental step of displacement imparted to the shaft 19 may be varied. For this purpose there is provided an annular member 28 freely rotatable around the sleeve 38 preferably with the interposal of a bushing as shown, and the member 28 includes a camming portion 27 adapted to be engaged by the pawl 42 at a particular point of the rotation of the pawl-carrying member 41 so as to cause the pawl to be disabled for the remainder of such rotation. By adjusting the angular position of sleeve 28 with the cam portion 27 thereof relatively to the pawl-carrying sleeve 41, the particular point at which the pawl is disabled may be controlled and the desired adjustment of each step of intermittent displacement thereby adjusted as explained previously.

It is important however that such adjustment will not be affected by the particular angular position of the sprocket gear 26, i.e. the particular vertical elevation of the movable carriage assembly. For this purpose the cam-carrying sleeve 28 is itself subjected to similar angular displacements as is the sprocket 26 and pawl carrying member 41. Thus, the cam sleeve 28 is formed near its top end with a sprocket gear 28' similar in diameter and pitch to drive sprocket 26, and an auxiliary sprocket chain 50 is trained around this additional sprocket and has its one end anchored to one end of a tension spring 51 the other end of which is anchored to the frame as at k. The other end of the chain 50 is passed around a sprocket gear 52 dimensioned identically with sprocket gear 35 and mounted coaxially with the latter being keyed on a stub shaft 53 which is freely rotatable in the hollow stub shaft 36 on which sprocket 35 is journalled. The free end of chain 50 is suitably anchored to a point of the periphery of the sprocket gear 52 itself. Thus it will be apparent that by adjusting the angular position of sprocket 52, the relative angular position of camming sleeve 28 may be adjusted relative to that of pawl sleeve 41 in order to produce the desired stepping rate adjustment for the carriage assembly, and it will also be clear that such adjustment will hold good throughout the full range of vertical displacements of the carriage 13, since such vertical displacements will act through the respective chains 25 and 50 to affect the angular positions of both sleeves to an equal degree. Thus in Fig. 4 the full-line showing relates to the condition of the system in an uppermost position of the vertically movable carriage assembly, while the chain-lines illustrate the condition in the lowermost position of said assembly.

The angular adjustment of sprocket gear 52 may conveniently be accomplished as illustrated by providing the sprocket 52 with an extension part formed with a tapped opening through which an adjustable screw 54 is threaded, the tip of the screw being adapted through a ball 55 to abut against the end surface of an inwardly projecting screw rod 56 threaded through the casing wall and rotatable from outside in order to adjust the angular position of sprocket 52 and hence the length of each step of movement imparted to the carriage assembly through the mechanism described.

In the modified embodiment of the invention diagrammatically illustrated in Fig. 5, the one-way drive rather than using a pawl-and-ratchet mechanism comprises a pair of balls 57 conventionally operating in dissymmetrical recesses formed in the member 41 rigid with the drive sprocket 26, and said balls cooperating with the (herein smooth) internal periphery of the member 45 which herein is directly secured to the shaft 15 to which intermittent rotation is to be imparted. The chain 25" has its end opposite from that secured to the tension spring 25'a, attached to one end 59 of a lever 60 pivoted at 61 on the frame of the machine, and normally urged by the tension spring 25'a into a position wherein the upper end of the lever engages an adjustable stop 64 threaded through the casing wall and adjustable from outside by means of a knob or the like 65. Pivotally supported on the lever 60 at a point 62 spaced a predetermined distance h from the pivotal center 61 of the lever is a roller 63. Moreover a drum 66 is secured to the excenter 6a coaxially with it. It will be observed that so long as the periphery of drum 66 does not engage roller 63 at any point during the excentric rotation of said drum, the lever 60 remains stationary and holds the end 59 of the chain 25" in a fixed position, so that the operation of the chain drive is unchanged with respect to that previously described. However, should the adjustment be such that the drum 66 engages the roller 63 at a certain point during the revolution of the excenter, the lever 60 will be deflected and the anchor point 59 of the chain will move so as to compensate for the excentric displacement of the sprocket pinion 29 over the remaining part of the particular revolution thereof. Thus, no displacement will be transmitted to the drive sprocket 26 through said remaining part of the revolution. It will be seen therefore that with the spacing $h$ appropriately predetermined with respect to the diameters of the roller 63 and drum 66, adjustment of the stop control 65 will modify the operative range of the chain drive and thereby achieve the desired stepping rate adjustment of the carriage assembly. One advantage of the construction of Fig. 5 over that previously shown and described is that it permits a continuous range of adjustment in the stepping range, in contrast with the discontinuous adjustment which is present when a pawl-and-ratchet mechanism is used as in the first described construction.

The above described machine operates as follows: Shaft 6 turns continuously and, by reason of the presence of excentric 6a, chain 25 undergoes a longitudinal oscillating movement in the direction of the arrows F while the spring 51 simultaneously extends and contracts.

The pinion 26 at the same time effects an oscillating rotary movement on shaft 19 and carries with it, by reason of the sleeve 38, the hub portion 41. When the hub portion 41 turns in the direction of the arrow $F_1$, nothing is driven, but when the hub portion 41 turns in the direction of the arrow $F_2$, it carries with it, by reason of the presence of the pawl 42, the member 45 which in turn moves the casing 46 by the action of the balls 47. Since the casing 46 is rigid with the shaft 19, this shaft thus receives an intermittent rotary movement which is communicated, through the gearing in gear case 20, to one or the other of the shafts 9 and 15, depending upon the direction of movement it is desired to impart to the table 8, i.e. transverse movement or vertical movement. The amplitude of the movement effected is determined by the relative position of the cam portion 27 in relation to the ends of the circular course followed by the pawl 42.

When the casing 13 is lowered, for example to the position 13' as shown in Fig. 4, the chain 25 assumes the position 25'. When the pinion 26 has rotated with the chain 25 and has carried with it the member 41 in the direction of the arrow $F_1$, the pawl 42 is, for example, in the position 42', having slid over the internal teeth of the member 45 which has remained motionless. The cam portion 27 at the same time undergoes rotation of the same amplitude since the pinions 26 and 28 have the same diameter and the chains 25 and 50 are superimposed when viewed in elevation. As a result, the cam portion 27 reaches the position 27' and the amplitude of the movement transmitted to the shaft 17, depending upon the relationship between the path travelled by the member 41 and the path of the member 45, remains constant in spite of the lowering of the casing 13.

What I claim is:

1. In a machine assembly, a stationary frame, an assembly linearly movable relative to said stationary frame and including a part movable relative to said movable assembly, a continuously rotatable member journalled on said frame, a one-way drive device in said movable assembly including a drive element and a driven element, said rotatable member and said drive element being in parallel relationship, means connecting said rotatable member in the stationary frame with said drive element in said movable assembly, said means being adapted for uninterrupted conversion of the continuous rotation of said member into reciprocation of said drive element in said movable assembly, said connecting means engaging said drive means tangentially, one-way drive means interconnecting said drive and driven elements whereby reciprocation of said drive element will cause an intermittent one-way displacement of said driven element, and means operatively connecting said driven element with said part for producing an intermittent displacement of said part.

2. In a machine assembly, a stationary frame, an assembly linearly movable relative to said stationary frame and including a part movable relative to said movable assembly, a continuously rotatable member journalled on said frame and having an excenter thereon, a drive element in said movable assembly, flexible means having at least one end expansibly connected with said frame and said means engaging both said excenter and said drive element whereby rotation of said rotatable member in the stationary frame will produce an expanding-contracting reciprocation of said flexible means and a reciprocation of said drive element in said movable assembly, a driven element in said movable assembly and one-way drive means between said drive and driven elements whereby reciprocation of the former will cause an intermittent one-way rotation of the latter element, and means connecting said driven element with said part.

3. The combination claimed in claim 2, wherein said flexible means comprise a sprocket chain having an expansible spring portion, a first sprocket gear freely journalled on said excenter and engaging said chain, and a second sprocket gear secured to said drive element in said movable assembly and engaging said chain.

4. In a machine, a stationary frame, an assembly linearly movable relative to said frame and a part supported by and movable relative to said movable assembly, a continuously rotatable member journalled on said stationary frame and an eccentric element supported by said member, a drive element rotatable in said movable assembly, a flexible means having at least one end expansibly connected with said frame and said means engaging both said eccentric element and said drive element in said movable assembly whereby rotation of said member in said stationary frame will produce an expanding-contraction reciprocation of said flexible means and a reciprocation of said drive element in said movable assembly, a driven element rotatable in said movable assembly and a one-way drive connection from said drive to said driven element in said movable assembly, whereby reciprocation of the former will cause an intermittent rotation of the latter element, means connecting said driven element with said part, and adjusting means for varying the length of each step of intermittent rotation imparted by said drive to said driven element in said movable assembly, said adjusting means comprising a member angularly adjustable relatively to both said drive element and said driven element in said movable assembly for disabling said one-way drive connection at a selected point of the rotation of said drive element, a rotatable control element on said frame, and second flexible means having at least one end connected to said second expansible means, said flexible means connecting said control element and said adjustable member for angularly adjusting said adjustable member on rotation of said control.

5. In the combination claimed in claim 2, adjustable means operated by said excenter adapted for engaging said flexible means over part of each revolution of said excenter, whereby said flexible means will then follow said excenter to cancel the reciprocation of said flexible means over said part of each revolution so as to vary each incremental step of said intermittent displacement.

6. In a machine, a stationary frame, an assembly linearly movable relative to said frame and a part supported by and movable relative to said movable assembly, a continuously rotatable member journalled on said stationary frame and an excentric element supported by said member, gear means on said excentric element, a drive element rotatable in said movable assembly, flexible means having at least one end expansibly connected with said frame and said means engaging both said gear means on said excentric element and said drive element in said movable assembly whereby rotation of said member in said stationary frame will produce an expanding-contraction reciprocation of said flexible means and a reciprocation of said drive element in said movable assembly, a driven element rotatable in said movable assembly and a one-way drive connection from said drive to said driven element in said movable assembly, whereby reciprocation of the former will cause an intermittent rotation of the latter element, means connecting said driven element with said part, and adjusting means for varying the length of each step of intermittent rotation imparted by said drive to said driven element in said movable assembly.

7. The combination claimed in claim 6, wherein said adjusting means comprises means for disabling said one-way connection over a selected part of the reciprocatory stroke of said drive element in said movable assembly.

8. The combination claimed in claim 6, wherein said one-way drive connection comprises a pawl and ratchet mechanism, and said adjusting means comprises a member angularly adjustable relatively to said elements for disabling said pawl at a predetermined point of the rotation of said drive element in said movable assembly.

9. The combination claimed in claim 6, wherein said adjusting means comprises a member angularly adjustable relatively to said elements for disabling said one-way drive connection at a predetermined variable point of the rotation of said drive element in said movable assembly.

References Cited in the file of this patent

UNITED STATES PATENTS

| 293,957 | Ellrich | Feb. 19, 1884 |
| 1,807,035 | Herman | May 26, 1931 |
| 2,709,370 | Bailey et al. | May 31, 1955 |
| 2,810,302 | James | Oct. 22, 1957 |